United States Patent
Zhang

(10) Patent No.: US 12,533,900 B2
(45) Date of Patent: Jan. 27, 2026

(54) TRADEMARK ANTI-COUNTERFEITING METHOD BASED ON CRYPTOGRAPHY

(71) Applicant: Nanhu Laboratory, Jiaxing (CN)

(72) Inventor: Lei Zhang, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 18/751,602

(22) Filed: Jun. 24, 2024

(65) Prior Publication Data
US 2024/0424818 A1   Dec. 26, 2024

(30) Foreign Application Priority Data

Jun. 26, 2023   (CN) .......................... 202310757285.2

(51) Int. Cl.
*B41M 3/14*   (2006.01)
*H04L 9/32*   (2006.01)

(52) U.S. Cl.
CPC .............. *B41M 3/14* (2013.01); *H04L 9/3247* (2013.01)

(58) Field of Classification Search
CPC ........... B41M 3/14; H04L 9/3247; H04L 9/32
USPC .......................... 283/67, 70, 72, 74, 98, 901
See application file for complete search history.

(56) References Cited

U.S. PATENT DOCUMENTS

| | | | |
|---|---|---|---|
| 2009/0169019 A1* | 7/2009 | Bauchot | G06Q 10/08 380/278 |
| 2018/0012311 A1* | 1/2018 | Small | B22F 10/39 |

FOREIGN PATENT DOCUMENTS

| | | |
|---|---|---|
| CN | 102201100 A | 9/2011 |
| CN | 108182654 A | 6/2018 |
| CN | 116503234 B | 11/2023 |

OTHER PUBLICATIONS

First Office Action, The State Intellectual Property Office of People's Republic of China, for Application No. 202310757285.2, dated Aug. 8, 2023.
Notification to Grant Petition Right for Invention, Application No. 202310757285.2, dated Sep. 20, 2023.

* cited by examiner

*Primary Examiner* — Justin V Lewis
(74) *Attorney, Agent, or Firm* — Troutman Pepper Locke LLP

(57) ABSTRACT

A trademark anti-counterfeiting method based on cryptography is provided, where a trademark owner prints an anti-counterfeiting code associated with a trademark image through a specific method. A verifier executes following verification process: collecting a trademark image by using a photosensitive device; measuring K feature points of collected trademark image to obtain N groups of color values; calculating M_i' and a hash value MH_i' of M_i'; using the photosensitive device to read N MH_i values, MH and MH signature values of anti-counterfeiting code, and using a public key to verify validity of MH signature value; if the MH signature value is valid, performing fusion operation on N MH_i values, determining whether result of fusion operation is MH, if so, determining that N MH_i values are valid; comparing MH_i' with MH_i one by one, and if the comparison is successful, the verification is successful, otherwise the verification fails.

5 Claims, 4 Drawing Sheets

TRADEMARK ANTI-COUNTERFEITING METHOD BASED ON CRYPTOGRAPHY

CROSS-REFERENCE TO RELATED APPLICATION

This patent application claims the benefit and priority of Chinese Patent Application No. 202310757285.2 filed with the China National Intellectual Property Administration on Jun. 26, 2023, the disclosure of which is incorporated by reference herein in its entirety as part of the present application.

TECHNICAL FIELD

The present disclosure relates to the field of trademark anti-counterfeiting technology, in particular to a trademark anti-counterfeiting method based on cryptography.

BACKGROUND

With the development of counterfeiting technology, trademark anti-counterfeiting is currently a big problem in the industry. At present, the main means include a laser anti-counterfeiting technology and an anti-counterfeiting watermarking technology, but these anti-counterfeiting technologies have a high anti-counterfeiting cost and a poor anti-counterfeiting effect.

First, when a trademark holder prints the same trademark based on an ordinary printing device, there may be deviation in the pixel color value of each printed trademark itself, which brings great difficulty to verify authenticity of the trademark based on the comparison of pixel color values during verification. Second, in the process of trademark verification, a verifier needs to collect trademark image information, and needs to communicate with a trademark database in real time to acquire the detailed information of trademark comparison from the database, and then compares the information to verify the authenticity, which is costly.

In order to solve a trademark anti-counterfeiting problem and achieve a better anti-counterfeiting effect, people have made a lot of research. For example, Chinese patent application No. 20110119710.2 provides a method and system for article anti-counterfeiting. In this method, image information is read, encrypted and signed, and an anti-counterfeiting code is generated for a signature file. During verification, the user acquires the anti-counterfeiting code information and in turn acquires the signature file, then uses a public key to obtain the corresponding image information. Thereafter, the user can judge the authenticity through comparing the image presented by scanning with the image on the article. This method proposes to generate an anti-counterfeiting code by using a public key, a private key and a digital signature. The anti-counterfeiting code contains a unique private key signed by the trademark owner, so that the counterfeiter cannot generate the anti-counterfeiting code by himself. However, there are some problems in the above methods.

1. This method puts forward that labels are unique, and a large number of products should be given unique labels. The labels can be used by the verifier to compare with the obtained image information, which is actually difficult to achieve and will lead to an increase in the anti-counterfeiting cost.
2. In this method, a transparent material with randomly changing light transmission and reflection characteristics is made into a thin film to cover the trademark so that the label is unique and unduplicated. However, on the one hand, this method needs to cover an extra layer of thin film that is expensive, which will also lead to an increase in cost. On the other hand, the scheme displays the trademark image by scanning the anti-counterfeiting code for users to judge whether the displayed image is consistent with the image on the trademark, but it is actually difficult for users to distinguish the uniqueness of the label realized by this transparent material with naked eyes, which causes inconvenience to the anti-counterfeiting verification process of users.

SUMMARY

The purpose of the present disclosure is to provide a trademark anti-counterfeiting method based on cryptography, which combines cryptography to realize trademark anti-counterfeiting performance, and can realize anti-counterfeiting verification in an offline way without an expensive high-precision printing device, thus achieving anti-counterfeiting performance at low cost and enjoying a better anti-counterfeiting effect.

In order to achieve the above purpose, the present disclosure uses the following technical scheme.

A trademark anti-counterfeiting method based on cryptography is provided, including:

implementing anti-counterfeiting means by a trademark owner:

Step A1, printing a trademark image by using a trademark printing device;

Step A2, measuring color values of k feature point pixels of the trademark image by using a photosensitive device, and dividing k color values into N groups;

Step A3, performing fusion calculation on each group of color values to obtain $M\_i$, and calculating a hash value $MH\_i$ of $M\_i$, where $i=1, 2, \ldots, N$, which represents an i-th group;

Step A4, performing fusion operation on N $MH\_i$ to obtain MH;

Step A5, signing MH with a private key, and printing an anti-counterfeiting code associated with the trademark image based on N $MH\_i$ and signature information of the MH; the signature information of the MH includes MH and its signature value; the anti-counterfeiting code is printed on commodities or commodity packages to be read during verification.

Using, by a verifier, specific software to verify the anti-counterfeiting means:

Step B1, collecting the trademark image by using the photosensitive device;

Step B2, measuring K feature points of the trademark image collected in Step B1 in the same way as Step A2 to obtain N groups of color values;

Step B3, calculating $M\_i'$ in the same way as Step A3, and calculating a hash value $MH\_i'$ of $M\_i'$;

Step B4, using the photosensitive device to read N $MH\_i$ values, MH and MH signature value of the anti-counterfeiting code, and using a public key to verify validity of the MH signature value;

if the MH signature value is valid, performing fusion operation on N $MH\_i$ values, and determining whether a result of the fusion operation is MH, if so, determining that N $MH\_i$ values are valid; and the way of fusion operation here is the same as that in Step A4;

Step B5, comparing $MH\_i'$ with $MH\_i$ one by one, and if the comparison is successful, verification is successful, otherwise the verification fails.

In the trademark anti-counterfeiting method based on cryptography described above, Step B5 includes:
Step B51, assuming r=0, and determining whether each pair of MH_i' and MH_i are the same, if they are the same, adding 1 to r;
Step B52, repeating Step B51 until comparison of N groups of color values is completed, thereby obtaining a final statistical value r;
Step B53, obtaining a verification result according to a relationship between r and N.

In the trademark anti-counterfeiting method based on cryptography described above, when r=N, the verification is successful, otherwise the verification fails; or, when s is greater than or equal to a predetermined percentage threshold, the verification is successful, otherwise the verification fails; where s=r/N.

In the trademark anti-counterfeiting method based on cryptography described above, the predetermined percentage thresholds corresponding to different photosensitive device models are stored by the software used by the verifier;
when a user carries out anti-counterfeiting verification, a model of a photosensitive device used by the user is received or detected, and a percentage threshold is determined accordingly, and a verification result is given in Step B53 based on the determined percentage threshold.

In the trademark anti-counterfeiting method based on cryptography described above, in Step A3, fusion calculation is performed on each group of color values to obtain M_i, and no hash value is calculated for M_i;
in Step A4, fusion calculation is performed on N M_i to obtain M;
in Step A5, M is signed with a private key, and an anti-counterfeiting code associated with the trademark image is printed based on N M_i and signature information of M;
in Step B3, M_i' is calculated in the same way as Step A3;
in Step B4, the photosensitive device is used to read N M_i values, M and its signature value of the anti-counterfeiting code, and a public key is used to verify validity of the signature value;
if the signature value is valid, it is determined that the M value is valid, and then it is determined whether fusion operation result of N M_i values is M, if so, it is determined that N M_i values are valid; in Step B5, comparing M_i' with M_i one by one, and if comparison is successful, the verification is successful, otherwise the verification fails.

In the trademark anti-counterfeiting method based on cryptography described above, Step B5 includes:
Step B51, assuming r=0, calculating similarity between each pair of M_i' and M_i, and if the similarity is greater than a predetermined threshold, adding 1 to r;
Step B52, repeating Step B51 until comparison of N groups of color values is completed, thereby obtaining a final statistical value r;
Step B53, obtaining a verification result according to a relationship between r and N.

In the trademark anti-counterfeiting method based on cryptography described above, when r=N, the verification is successful, otherwise the verification fails; or,
when s is greater than or equal to a predetermined percentage threshold, the verification is successful, otherwise the verification fails; where s=r/N;

predetermined percentage thresholds corresponding to different photosensitive device models are stored by the software used by the verifier;
when the user performs anti-counterfeiting verification, a model of a photosensitive device used by the user is received or detected, a percentage threshold is determined accordingly, and the verification result is given in Step B53 based on the determined percentage threshold.

In the trademark anti-counterfeiting method based on cryptography described above, fusion calculation in Step A3 includes addition operation and/or XOR operation between a plurality of color values;
MH obtained by performing fusion operation on N MH_i in Step A4 includes addition operation and/or XOR operation between MH_i; taking the addition as an example, MH=(MH_1+MH_2+ . . . +MH_x), in which x=N, which represents the N-th.

In the trademark anti-counterfeiting method based on cryptography described above the fusion calculation in Step A3 includes addition operation and/or XOR operation between a plurality of color values;
MH obtained by performing fusion operation on N MH_i in Step A4 includes addition operation and/or XOR operation between MH_i; taking the addition as an example, MH=(MH_1+MH_2+ . . . +MH_x), in which x=N, which represents the N-th.

In the trademark anti-counterfeiting method based on cryptography described above, in Step A1, the trademark owner uses the trademark printing device to print the trademark image on a product;
in Step A5, the trademark owner uses an anti-counterfeiting code printing device to print the anti-counterfeiting code beside the trademark image on the product;
the trademark printing device, the photosensitive device and the anti-counterfeiting code printing device are sequentially arranged on a product packaging production line of the trademark owner. The product packaging is printed with a trademark image by the trademark printing device, then the trademark image is measured by the photosensitive device connected to the anti-counterfeiting code printing device; and the anti-counterfeiting code printing device obtains MH/M and its signature value based on a measurement result of the trademark image, and prints the anti-counterfeiting code on the product packaging based on obtained MH/M and its signature value.

The present disclosure has the following advantages.
1. The trademark owner only needs to use an ordinary printing device, which reduces the anti-counterfeiting cost;
2. The colors of trademark images printed by an ordinary printing device are inconsistent, so that it is difficult for counterfeiters to counterfeit the trademark images, which increases the counterfeiting cost, reduces the possibility of a large amount of counterfeiting, and thus improving the anti-counterfeiting effect.
3. The anti-counterfeiting code is combined with the feature points of the trademark, and a digital signature anti-counterfeiting code is generated based on the feature points, so that the counterfeiter cannot forge trademark by reprinting the trademark image and generating the anti-counterfeiting code according to the reprinted trademark image, thereby achieving anti-counterfeiting performance and improving the anti-counterfeiting effect.

4. In the process of trademark verification, only offline verification is needed, and the trademark owner needs not to provide an anti-counterfeiting database, thus further reducing the anti-counterfeiting cost of the trademark owner. At the same time, the verifier only needs to use a device with a corresponding application (APP) and a photosensitive device for offline operation, which is very convenient and cheap.

5. The information contained in the trademark anti-counterfeiting code is related to Hash value and has been signed, and cannot be tampered with. Moreover, information (feature points) in the trademark cannot be leaked, which can ensure the security of the information.

6. In this scheme, the trademark is printed firstly, and the values of feature points in the trademark are read for verification based on the printed trademark (colors, and other information, may be inconsistent). In this way, only a low-precision ordinary printing device needs to be used, which greatly reduces the cost. However, it is still very difficult for counterfeiters unless they can copy the same trademark which is printed with high-precision and without distortion. This problem can be easily overcome by the trademark owner by increasing the percentage threshold of r/N.

DETAILED DESCRIPTION OF THE EMBODIMENTS

The present disclosure will be described in further detail with reference to the attached drawings and detailed description.

Embodiment 1

Figure 1:
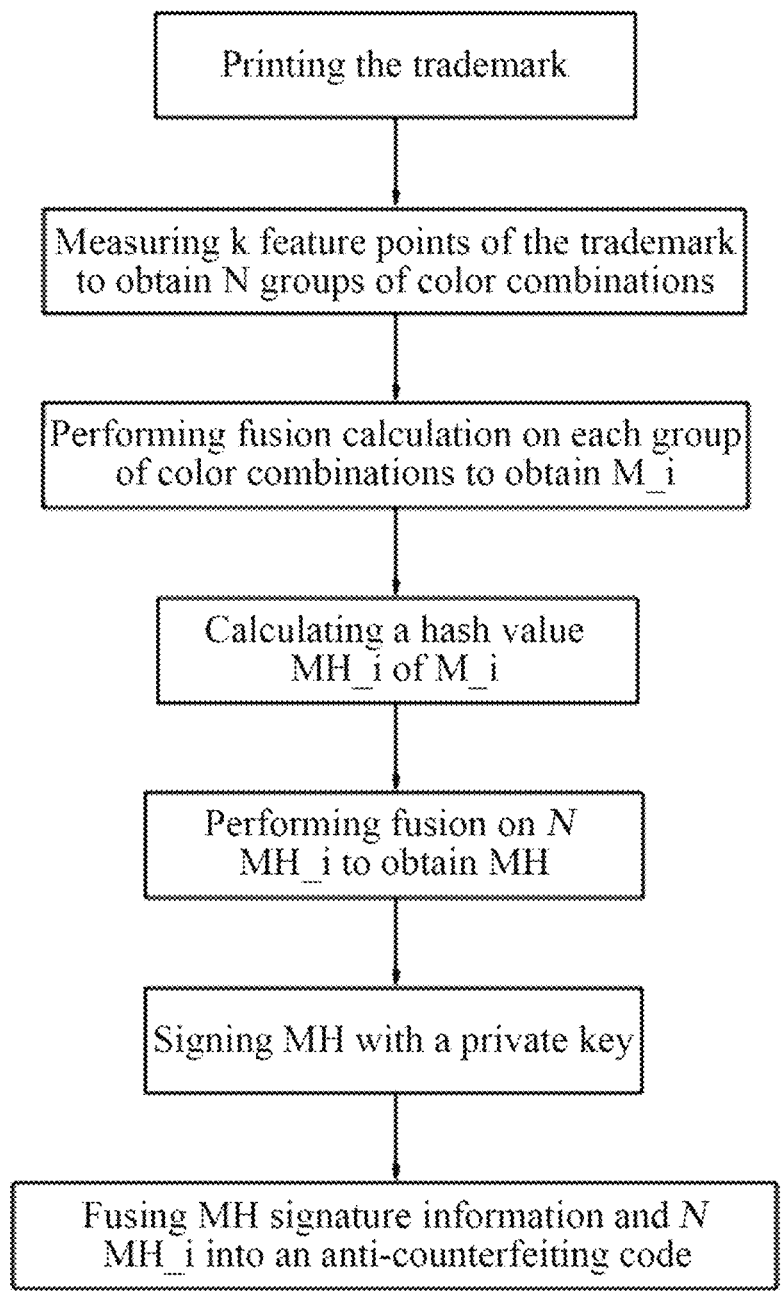
FIG. 1 is a flowchart of a method implemented by a trademark owner in Embodiment 1 of a trademark anti-counterfeiting method based on cryptography according to the present disclosure.
Figure 2:
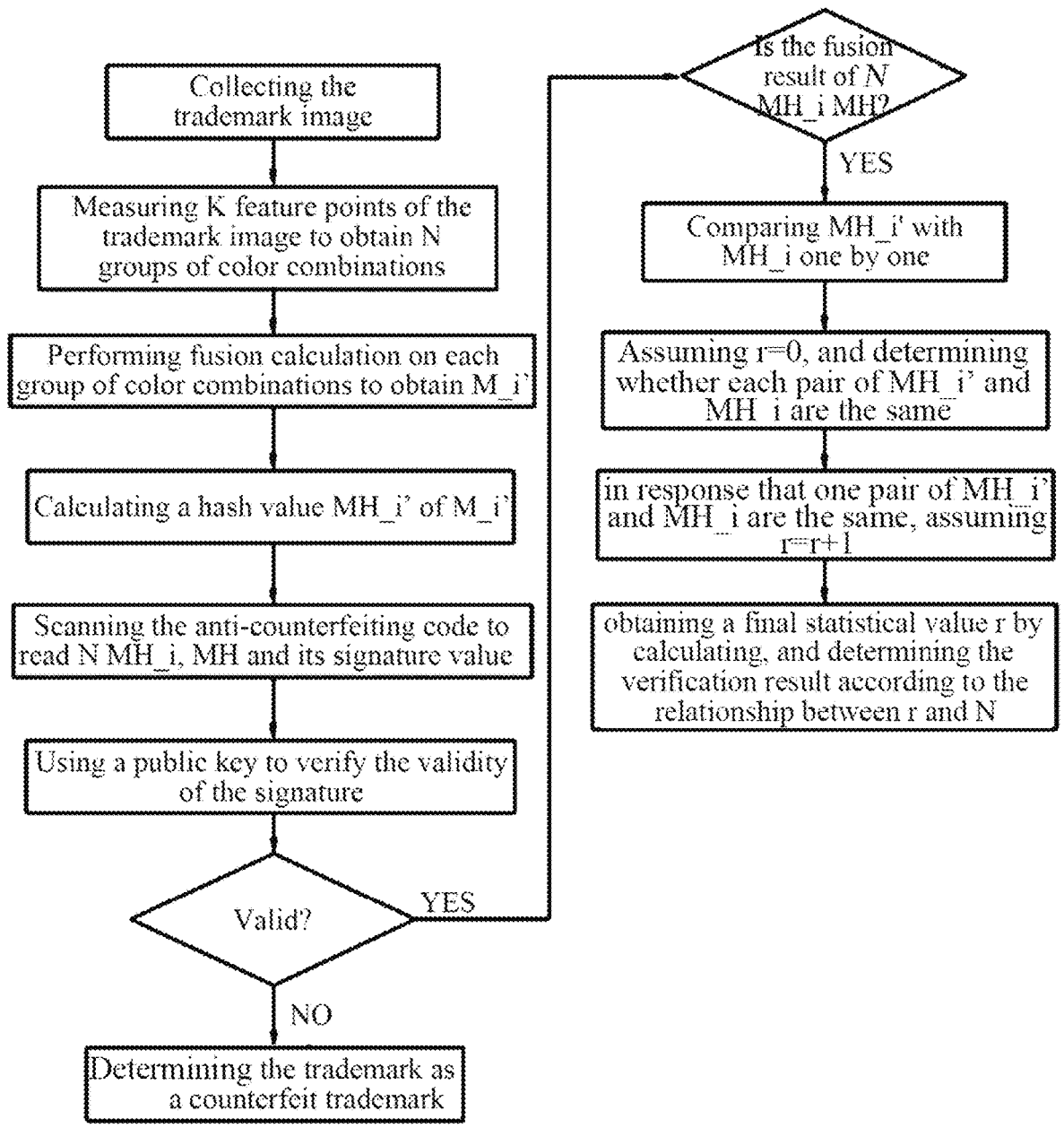
FIG. 2 is a flowchart of a method implemented by a verifier in Embodiment 1 of a trademark anti-counterfeiting method based on cryptography according to the present disclosure.

The present disclosure provides a trademark anti-counterfeiting method based on cryptography, as shown in FIGS. 1 and 2, including following steps 1 to 14.

Step 1. The trademark owner generates a public key and a private key based on asymmetric algorithm of cryptography. Based on the principle of cryptography, the private key is used for the signature process, and the public key is used to authenticate and verify the signature.

Step 2. The trademark owner defines several trademark feature point pixels D, and selects K feature points at different positions of the trademark. The coordinates are $(x\_1, y\_1) \ldots (x\_k, y\_k)$.

Step 3. The trademark owner divides K feature points into N groups, such as $(d1 \ldots d3)$, $(d4 \ldots d6)$, ... $(dk-2 \ldots dk)$.

Step 4. The trademark owner prints the trademark by using an ordinary trademark printing device.

Step 5. For each printed trademark, the trademark owner measures the color values c, that is, $(c1, c2, \ldots, ck)$, of the above K feature point pixels by using a photosensitive device (a mobile phone camera, a camera, etc.) and divides the color values into N groups: $(c1 \ldots cx)$, $(cx+1 \ldots cy)$, ... $(cz \ldots ck)$.

Step 6. The trademark owner performs fusion calculation on each group of color values, to obtain a result of M_i. The fusion calculation includes but is not limited to various operations such as addition and XOR, and the fusion value reflects values of different feature points in each group. Finally, the hash value of M_i is calculated and denoted as MH_i (i is 1 to N). The MH_i can be short hash (for example, less than 32 bytes).

Step 7. The trademark owner performs fusion operations on N MH_i:MH=(MH_1+MH_2+ ... +MH_x), and signs MH based on the private key. MH and its signature value can be presented beside the trademark. The reflecting manner includes, but is not limited to, Quick Response (QR) codes printed beside the trademark, color QR codes, etc. In this embodiment, the reflecting manner is QR codes. That is, the QR code beside the trademark contains N MH_i and MH signature value information, and the MH signature value information includes MH. Generally speaking, the trademark owner can print the QR code beside the trademark, and the QR code is on the same packaging paper as the trademark.

The trademark anti-counterfeiting verifying step is described as follows.

Step 8. The trademark verifier collects the trademark image by using the photosensitive device (a mobile phone camera, a camera, etc.).

The photosensitive device can be provided by the trademark owner or can be an ordinary photosensitive device (a mobile phone) of the verifier. But the device has been integrated the software provided by the trademark owner. For example, the mobile phone is installed APP of the trademark owner. The software carries the operation logic (including the selection position of K feature points, the grouping method, the hash value calculation method, etc.) and the public key provided by the trademark owner.

Step 9. The trademark image is collected by the device, and the feature points is measured by using the software, and the feature points are divided into $(c1' \ldots cx')$, $(cx+1' \ldots cy')$, ... $(cz' \ldots ck')$.

Step 10. M_i' is calculated according to the operation logic in the software of the trademark owner (Step 6), and the hash value of M_i' is calculated and denoted as MH_i'.

Step 11. The trademark verifier reads N MH_i values, MH and its signature value (a printed QR code is generated in Step 7) by using the photosensitive device (a mobile phone camera, a camera, etc.), and verifies the validity of the signature value based on the public key carried by the device software. If the signature value is valid, the validity based on the MH information in the QR code can be determined. The device software performs fusion operation on the obtained N MH_i (the operation method is the same as Step 7), and determines whether the result of the fusion operation is MH. If so, it is determined that the MH_i part in the QR code has not been tampered with, and it is determined that the N MH_i values are valid. Otherwise, verified trademark is determined to be a counterfeit trademark.

Step 12. MH_i (MH_1, MH_2, .... MH_N) is compared with MH_i' (MH_1', MH_2', .... MH_N'), and the number r of times when the values of MH_i and MH_i' are equal is calculated.

Step 13. The similarity between the collected trademark image and the original genuine trademark is calculated and denoted as s=r/N.

Step 14. Ideally, if the verified trademark is the original trademark, the calculated values should be exactly the same, and s should be 100%. In some situations, such as in the case of different brands of photosensitive devices, there may be some slight deviation in reading the color values. Therefore, in this embodiment, the trademark owner defines a percentage threshold. If s is greater than the percentage threshold, the verified trademark is determined to be a genuine trademark by the software, otherwise the verified trademark is determined to be a counterfeit trademark. Generally, the trademark owner and the trademark verifier should use the same brand of photosensitive devices to ensure the high efficiency of verification.

Embodiment 2

Figure 3:
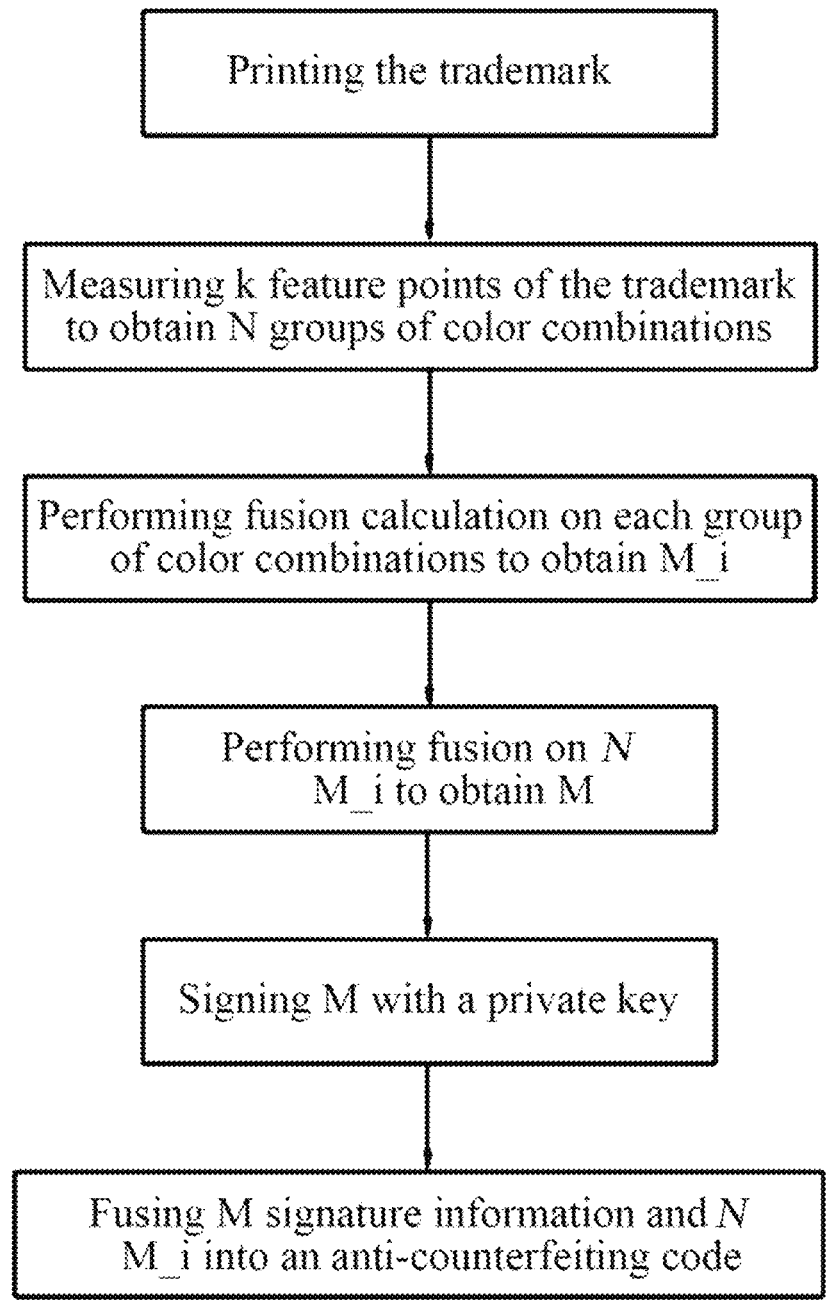
FIG. 3 is a flowchart of a method implemented by a trademark owner in Embodiment 2 of a trademark anti-counterfeiting method based on cryptography according to the present disclosure.
Figure 4:
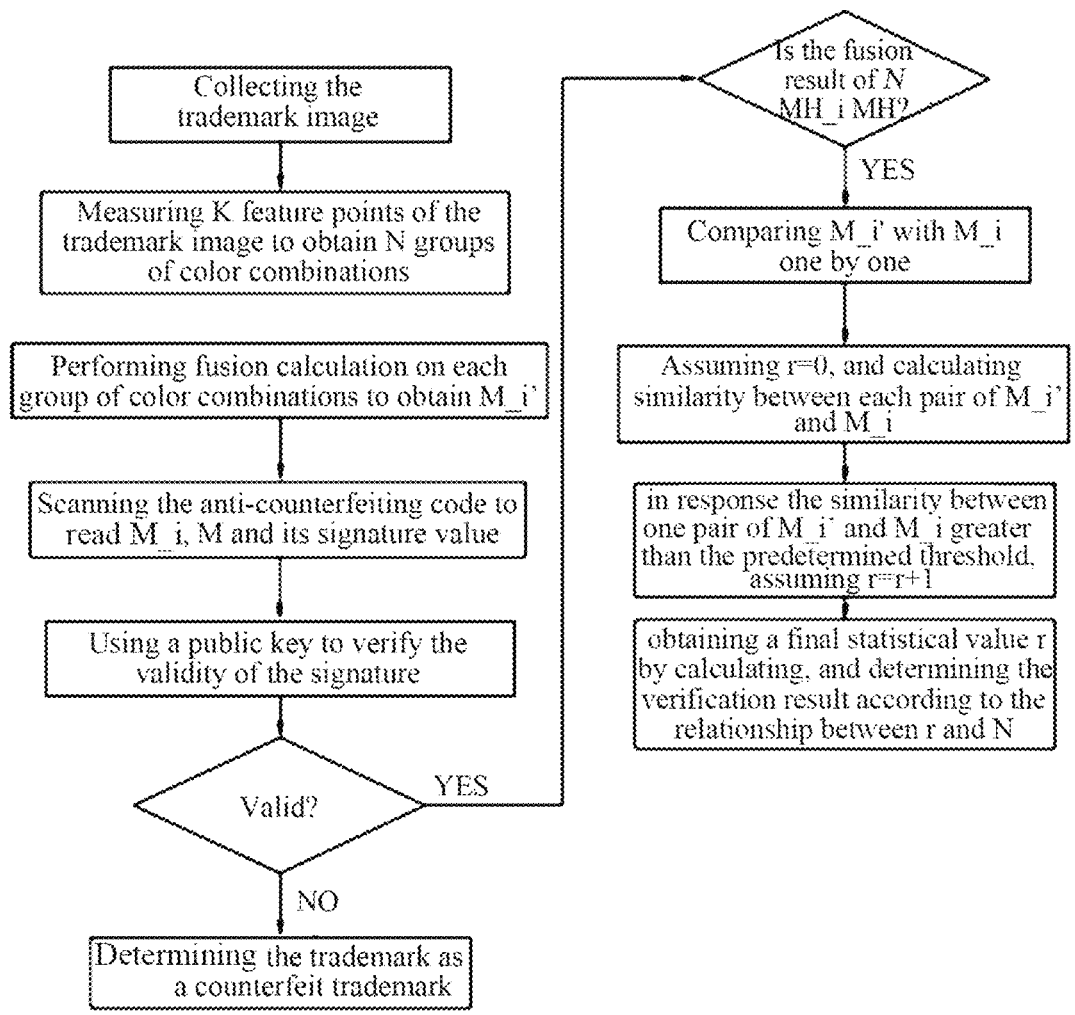
FIG. 4 is a flowchart of a method implemented by a verifier in Embodiment 2 of a trademark anti-counterfeiting method based on cryptography according to the present disclosure.

In the above embodiment, the trademark owner hashes the result M_i obtained by performing fusion calculation on each group of color combinations to obtained hash value, and then puts the hash value into the QR code to hide the M_i information. If the trademark owner considers that M_i information is not sensitive, the M_i information can also be directly placed in the QR code, as shown in FIGS. 3 and 4. The implementing steps of the situation are as follows.

Step 1. The trademark owner generates a public key and a private key based on asymmetric algorithm of cryptography. Based on the principle of cryptography, the private key is used for the signature process, and the public key is used to authenticate and verify the signature.

Step 2. The trademark owner defines several trademark feature point pixels D, and selects K feature points at different positions of the trademark. The coordinates are $(x\_1, y\_1) \ldots (x\_k, y\_k)$.

Step 3. The trademark owner divides K feature points into N groups, such as (d1 ... d3), (d4 ... d6), ... (dk−2 ... dk).

Step 4. The trademark owner prints the trademark by using an ordinary trademark printing device.

Step 5. For each printed trademark, the trademark owner measures the color values c, that is, (c1, c2, ..., ck), of the above K feature point pixels by using a photosensitive device (a mobile phone camera, a camera, etc.) and divides the color values into N groups: (c1 ... cx), (cx+1 ... cy), ... (cz ... ck).

Step 6. The trademark owner performs fusion calculation on each group of color values, to obtain a result of M_i. The fusion calculation includes but is not limited to various operations such as addition and XOR, and the fusion value reflects values of different feature points in each group.

Step 7. The trademark owner performs fusion operations on N MH_i:MH=(MH_1+MH_2+ ... +MH_x), and signs MH based on the private key. MH and its signature value can be presented beside the trademark. The reflecting manner includes, but is not limited to, QR codes printed beside the trademark, color QR codes, etc. In this embodiment, QR codes are also used. That is, the QR code beside the trademark contains N M_i, M and its signature value information.

The trademark anti-counterfeiting verifying step is described as follows.

Step 8. The trademark verifier collects the trademark image by using the photosensitive device (a mobile phone camera, a camera, etc.).

The photosensitive device can be provided by the trademark owner or can be an ordinary photosensitive device (a mobile phone) of the verifier. But the device has been integrated the software provided by the trademark owner. For example, the mobile phone is installed APP of the trademark owner.

Step 9. The trademark image is collected by the device, and the feature points are measured by using the software, and divided into (c1' ... cx'), (cx+1' ... cy'), ... (cz' ... ck').

Step 10. M_i' is calculated by the software according to the operation logic for the trademark owner (Step 6).

Step 11. The trademark verifier reads N M_i values, M and its signature value (a printed QR code generated in Step 7) by using the photosensitive device (a mobile phone camera, a camera, etc.), and verifies the validity of the signature value based on the public key carried by the device software. If the signature value is valid, the validity based on the M information in the QR code can be determined. The device software performs fusion operation on the obtained N M_i (the operation method is the same as Step 7), and determines whether the result of the fusion operation is M. If so, it is determined that the M_i part in the QR code has not been tampered with and is valid. Otherwise, the verified trademark is determined to be a counterfeit trademark.

Step 12. M_i (M_1, M_2, .... M_N) is compared with M_i' (M_1', M_2', .... M_N'), and the number r of times when the values of M_i and M_i' are equal is calculated. Note that M_i is not meaningless, but is obtained by performing fusion calculation on the pixel values of each group of feature points, and reflects the pixel values of all the feature point in each group. Therefore, the similarity between M_i and M_i' can be analyzed in a finer granularity and quantified. If the quantified similarity is greater than a certain threshold, although M_i and M_i' are not exactly the same, they can also be considered as roughly the same, and the number of times when the values of M_i and M_i' are equal is calculated.

Step 13. The similarity between the collected trademark and the original genuine trademark is calculated and denoted as s=r/N.

Step 14. Ideally, if the verified trademark is the original trademark, the calculated values should be exactly the same, and s should be 100%. In some situations, such as in the case of different brands of photosensitive devices, there may be some slight deviation in reading the color values. Therefore, in this embodiment, the trademark owner defines a preset threshold. If s is greater than the preset threshold, the verified trademark is determined to be a genuine trademark by the software, otherwise the verified trademark is determined to be a counterfeit trademark. Generally, the trademark owner and the trademark verifier should use the same brand of photosensitive devices to ensure the high efficiency of verification.

In actual applications, the production line of the trademark owner can be as follows: firstly, a trademark printing device is used to print trademarks on commodities, and then the commodities printed with trademarks are sent to the photosensitive device. The photosensitive device collects the trademark images and transmits the collected trademark images to the subsequent anti-counterfeiting code printing device. The anti-counterfeiting code printing device measures the trademark images based on steps in the above method, to obtain N groups of color combinations. And after subsequent steps such as fusion and signature, a final result is obtained. Based on the final result, the MH signature value and N MH_i, or the M signature value and N M_i are used to print an anti-counterfeiting code on the commodities.

By the method proposed in this scheme, firstly the trademark is printed, and then the feature points are collected in real time based on the printed trademark. The digital signature and in turn anti-counterfeiting code are generated based on the feature points, where the digital signature is based on the private key of the trademark owner, and cannot be counterfeited. For the trademark owner, an ordinary printing device is used to print the trademark image, which reduces the anti-counterfeiting cost.

For the anti-counterfeiting effect, on the one hand, there may be deviation in the color value among pixels of each trademark printed by an ordinary low-cost printing device, which brings great difficulties to verify the authenticity based on the comparison of pixel color values during verification. If the counterfeiter counterfeits by scanning the trademark image and the anti-counterfeiting code, although the same anti-counterfeiting code can be obtained, there may be deviation in the pixel color value due to different printing devices. Although the deviation may not be identified by the naked eye, a general photosensitive device will distinguish the difference. Thus, in the verification process, the value obtained in such a manner that the user scans the trademark image will be different from the value in the anti-counterfeiting QR code, so that the verification fails. If a high-precision scanning and printing device is used to achieve exactly the same pixel color value, the high-precision scanning and printing device is too expensive to be practically implemented. Therefore, the possibility of counterfeiting can be indirectly reduced.

On the other hand, in the case that instead of copying the trademark image, the counterfeiter prints the trademark through calculating the color combinations; performing subsequent steps such as fusion and signature; and based on the resultant final result, particularly based on MH signature information and N MH_i, or M signature information and N M_i, printing the anti-counterfeiting code on the commodities, the counterfeiter needs to know not only the definition rule, the signature algorithm and the fusion rule used by the trademark owner, but also the private key of the trademark owner so as to realize counterfeiting by this method. However, it is very difficult for the counterfeiter to know these private information, so the anti-counterfeiting method implemented in this scheme has a very good anti-counterfeiting effect. That is to say, by using the method of the scheme, the anti-counterfeiting effect is improved, while the anti-counterfeiting cost is reduced due to the use of an ordinary printing device to print the trademark.

In addition, by this method, in the process of trademark verification, the comparison database needs not to be connected. In traditional scheme, when verifying the authenticity of the trademark image, the verifier needs to collect the trademark image information, and connect the trademark database in real time to acquire the detailed comparison information of the trademark database for comparison, so as to verify the authenticity. The verification cost is high, and the trademark owner will not easily open the entire trademark database information (as confidential information) to the third-party verifier for connection at any time. Therefore, the trademark owner needs to have his own database, which additionally increases the anti-counterfeiting cost of the trademark owner. Based on cryptography, in the present disclosure, the anti-counterfeiting information after encryption is presented beside the trademark, so that the trademark verifier can verify the information offline. The trademark verifier only needs to determine the validity of the anti-counterfeiting code offline based on cryptography (a public key) and verify the authenticity of the trademark based on the validity of the anti-counterfeiting code. Only a photosensitive device equipped with the software of the trademark owner (such as the photosensitive device equipped with the authentication APP of the trademark owner) is needed to perform offline operation in the whole process, and the cost is very low.

The specific embodiments described herein are only illustrative of the spirit of the present disclosure. Those skilled in the technical field to which the present disclosure belongs can make various modifications or supplements to the described specific embodiments or make substitutions in a similar manner, which will not be deviated from the spirit of the present disclosure or exceed the scope defined by the appended claims.

What is claimed is:

1. A trademark anti-counterfeiting method, comprising:
performing, by a trademark owner, steps comprising:
printing a first trademark image by using a trademark printing device;
measuring color values of a plurality of feature point pixels of the first trademark image by using a photosensitive device, and grouping the color values to obtain a plurality of first color value groups, wherein a number of the plurality of first color value groups is denoted as N;
performing, by an anti-counterfeiting code printing device, a first addition operation on all color values of each first color value group to obtain values denoted as $M_i$, and calculating a hash value of each first color fusion value, as a first color first color fusion hash value denoted as $MH_1$, wherein i=1, 2, . . . , N;
performing a second addition operation on all first color fusion hash values to obtain a first hash fusion value denoted as $MH_2$; and
signing the first hash fusion value with a private key to obtain a first signature value, coding the first signature value, the first hash fusion value and all of the first color fusion hash values to generate a first anti-counterfeiting code associated with the first trademark image, and printing, by the anti-counterfeiting code printing device, the first anti-counterfeiting code; and
running, by a verifier, a software on a processor to implement anti-counterfeiting verification steps comprising:
collecting a second trademark image by using the photosensitive device;
measuring color values of a plurality of feature point pixels of the second trademark image collected by using the photosensitive device, and grouping the color values for the second trademark image to obtain a plurality of second color value groups, wherein a number of the plurality of second color value groups is equal to N;

performing a third addition operation on all color values of each second color value group to obtain second color fusion values denoted as $M_i'$, and calculating a hash value of each of the second color fusion values, as a second color fusion hash value denoted as $MH_i'$;

using the photosensitive device to read all third color fusion hash values, a third hash fusion value and a second signature value of a second anti-counterfeiting code, and using a public key to verify validity of the second signature value;

in response to a determination that the second signature value is valid, performing a fourth addition operation on all of the third color fusion hash values, and determining whether a result of the fourth addition operation is equal to the third hash fusion value; and in response to a determination that the result of the fourth addition operation is equal to the third hash fusion value, comparing each of all second color fusion hash values with a corresponding one of all of the third color fusion hash values to obtain a verification result, wherein the verification result indicates that the second trademark image is counterfeit or genuine.

2. The method according to claim 1, wherein the comparing each of all second color fusion hash values with a corresponding one of all of the third color fusion hash values to obtain a verification result comprises:

introducing a variable r with an initial value of 0, and determining whether each of all of the second color fusion hash values and corresponding one of all of the third color fusion hash values are same, upon being same, incrementing the variable r by 1;

wherein when r=N, the verification result indicating that the second trademark image is genuine, and when r≠N, the verification result indicating that the second trademark image is counterfeit.

3. The method according to claim 2, wherein in a process of printing the first trademark image by using the trademark printing device, the trademark owner uses the trademark printing device to print the first trademark image on a product; and in a process of printing, by the anti-counterfeiting code printing device, the first anti-counterfeiting code, the trademark owner uses the anti-counterfeiting code printing device to print the first anti-counterfeiting code beside the first trademark image on the product;

wherein the trademark printing device, the photosensitive device and the anti-counterfeiting code printing device are sequentially arranged on a product packaging production line of the trademark owner;

a product packaging is printed with the first trademark image by the trademark printing device;

the first trademark image is measured by the photosensitive device connected to the anti-counterfeiting code printing device; and the anti-counterfeiting code printing device obtains all of the first color fusion hash values and the first signature value, and prints the first anti-counterfeiting code on the product packaging.

4. The method according to claim 1, wherein in a process of printing the first trademark image by using the trademark printing device, the trademark owner uses the trademark printing device to print the first trademark image on a product; and in a process of printing, by the anti-counterfeiting code printing device, the first anti-counterfeiting code, the trademark owner uses the anti-counterfeiting code printing device to print the first anti-counterfeiting code beside the first trademark image on the product;

wherein the trademark printing device, the photosensitive device and the anti-counterfeiting code printing device are sequentially arranged on a product packaging production line of the trademark owner;

a product packaging is printed with the first trademark image by the trademark printing device;

the first trademark image is measured by the photosensitive device connected to the anti-counterfeiting code printing device; and the anti-counterfeiting code printing device obtains all of the first color fusion hash values and the first signature value, and prints the first anti-counterfeiting code on the product packaging.

5. The method according to claim 3, wherein in a process of printing the first trademark image by using the trademark printing device, the trademark owner uses the trademark printing device to print the first trademark image on a product; and in a process of printing, by the anti-counterfeiting code printing device, the first anti-counterfeiting code, the trademark owner uses the anti-counterfeiting code printing device to print the first anti-counterfeiting code beside the first trademark image on the product;

wherein the trademark printing device, the photosensitive device and the anti-counterfeiting code printing device are sequentially arranged on a product packaging production line of the trademark owner;

a product packaging is printed with the first trademark image by the trademark printing device;

the first trademark image is measured by the photosensitive device connected to the anti-counterfeiting code printing device; and the anti-counterfeiting code printing device obtains all of the first color fusion hash values and the first signature value, and prints the first anti-counterfeiting code on the product packaging.

\* \* \* \* \*